(12) United States Patent
Cao et al.

(10) Patent No.: US 12,208,736 B2
(45) Date of Patent: Jan. 28, 2025

(54) VEHICLE REAR-VIEW MIRROR ASSEMBLY

(71) Applicant: NINGBO MI RUO ELECTRONIC TECHNOLOGY CO., LTD, Ningbo (CN)

(72) Inventors: Zhenhu Cao, Ningbo (CN); Shanshan Hu, Ningbo (CN)

( * ) Notice: Subject to any disclaimer, the term of this patent is extended or adjusted under 35 U.S.C. 154(b) by 444 days.

(21) Appl. No.: 17/639,534

(22) PCT Filed: Nov. 28, 2020

(86) PCT No.: PCT/CN2020/132512
§ 371 (c)(1),
(2) Date: Mar. 1, 2022

(87) PCT Pub. No.: WO2021/143367
PCT Pub. Date: Jul. 22, 2021

(65) Prior Publication Data
US 2022/0340080 A1   Oct. 27, 2022

(30) Foreign Application Priority Data

Jan. 17, 2020   (CN) .......................... 202010052010.5
Jan. 17, 2020   (CN) .......................... 202020104757.6

(51) Int. Cl.
*B60R 1/08*   (2006.01)
*G02F 1/155*   (2006.01)
(Continued)

(52) U.S. Cl.
CPC .............. *B60R 1/088* (2013.01); *G02F 1/155* (2013.01); *G02F 1/157* (2013.01); *G02F 1/161* (2013.01);
(Continued)

(58) Field of Classification Search
CPC .................. B60R 1/088; B60R 1/1207; B60R 2001/1215; B60R 2001/1223;
(Continued)

(56) References Cited

FOREIGN PATENT DOCUMENTS

CN   109415015 A   3/2019

*Primary Examiner* — Wyatt A Stoffa
*Assistant Examiner* — Grant A Gagnon

(57) ABSTRACT

The present invention relates to a vehicle rear-view mirror assembly, comprising an electrochromic mirror element, said element comprising: a substantially transparent first electrically conductive base material, which comprises a first surface and a second surface as well as a first edge surface; a substantially transparent second electrically conductive base material, comprising a third surface and a fourth surface as well as a second edge surface; a sealing piece, approximately circumferentially arranged between peripheral areas of the first electrically conductive base material and the second electrically conductive base material, so as to seal and combine the second surface and the third surface and define an empty cavity; an electrochromic medium, which is arranged within the empty cavity; and a substantially transparent con-cave outer casing, comprising an outer casing upper part which has an upper part outer surface and an upper part inner surface, and an outer casing side part which has a side part outer surface and a side part inner surface, a covering layer being provided along the outer casing side part and an area along the periphery of the outer casing upper part; when examining from the concave outer casing outer surface, the sealing piece is hidden behind the covering layer. The present vehicle rear-view mirror has advantageous qualities such as being aesthetically pleasing as a whole, providing a wide field of view, being safe and injury preventing, and not easily shattering.

20 Claims, 10 Drawing Sheets

(51) Int. Cl.
 *G02F 1/157* (2006.01)
 *G02F 1/161* (2006.01)
 *B60R 1/12* (2006.01)

(52) U.S. Cl.
 CPC ..... *B60R 1/1207* (2013.01); *B60R 2001/1215* (2013.01); *B60R 2001/1223* (2013.01); *B60R 2001/1284* (2013.01)

(58) Field of Classification Search
 CPC .............. B60R 2001/1284; B60R 1/12; B60R 2001/123; B60R 2001/1253; B60R 2001/1276; G02F 1/155; G02F 1/157; G02F 1/161; G02F 1/153
 See application file for complete search history.

VEHICLE REAR-VIEW MIRROR ASSEMBLY

TECHNICAL FIELD

The present invention relates to the technical field of electrochromic devices, in particular to a vehicle rear-view mirror assembly provided with an electrochromic mirror element.

BACKGROUND

Electrochromism refers to that under the action of an external electric field, a material is subjected to a redox reaction or changes of charge (electron or ion) injection or extraction inside its molecular structure, thus causing reversible changes in optical properties of the material such as transmissivity, absorptivity and reflectivity in visible, infrared and ultraviolet light regions. This technology has very important application value in the fields of architectural glass, intelligent color-changing windows for automobiles, airplane portholes, color-changing sunglasses, anti-glare rear-view mirrors for automobiles, information display, military applications, etc.

GB15084-2006 "MOTOR VEHICLES-REAR VIEW MIRRORS-REQUIREMENTS OF PERFORMANCE AND INSTALLATION" and ECE-R46 "UNIFORM PROVISIONS CONCERNING THE APPROVAL OF REAR-VIEW MIRRORS, AND OF MOTOR VEHICLES WITH REGARD TO THE INSTALLATION OF REAR-VIEW MIRRORS" both stipulate the requirements for the field of vision of a rear-view mirror, and require a front edge of the rear-view mirror to be wrapped in a protective frame and the edge position to have a curvature radius no less than 2.5 mm for the sake of the safety of occupants.

In view of the requirements of the above regulations, in the prior art published by WO2004/098953 and WO2005/082015, for example, a plastic housing with a front opening is usually adopted, an electrochromic mirror element is fixed to the front opening, and the plastic housing usually has a plastic frame covering an edge surface of the electrochromic mirror element to meet the safety requirements proposed by the regulations.

SUMMARY

In a first aspect, the present invention provides a vehicle rear-view mirror assembly with an electrochromic mirror element. The electrochromic mirror element includes a substantially transparent first electrically conductive substrate, a substantially transparent second electrically conductive substrate, a sealing member which hermetically bonds the first electrically conductive substrate to the second electrically conductive substrate and defines a cavity, an electrochromic medium in the cavity, and a substantially transparent concave housing which is arranged at a periphery of the first electrically conductive substrate and the second electrically conductive substrate. The concave housing is integrally formed and provided with a shielding layer, thus having the advantages of a visually pleasing appearance, a wide field of vision, and being safe and collision-proof and less prone to damage.

In a second aspect, according to the provided substantially transparent concave housing, the present invention enables flexible design of the first electrically conductive substrate and the second electrically conductive substrate, so as to form various types of rear-view mirror assemblies with electrochromic mirror elements.

In a third aspect of the present invention, an improved electrode lead-out method for electrochromic mirror elements is provided in at least one embodiment, so as to realize quick and flexible assembly or disassembly of electrically conductive electrodes.

DETAILED DESCRIPTION

The following description is used to disclose the present invention to enable those of ordinary skill in the art to implement the present invention. The preferred embodiments described below are only examples, and other obvious variations are conceivable by those of ordinary skill in the art.

Figure 1:
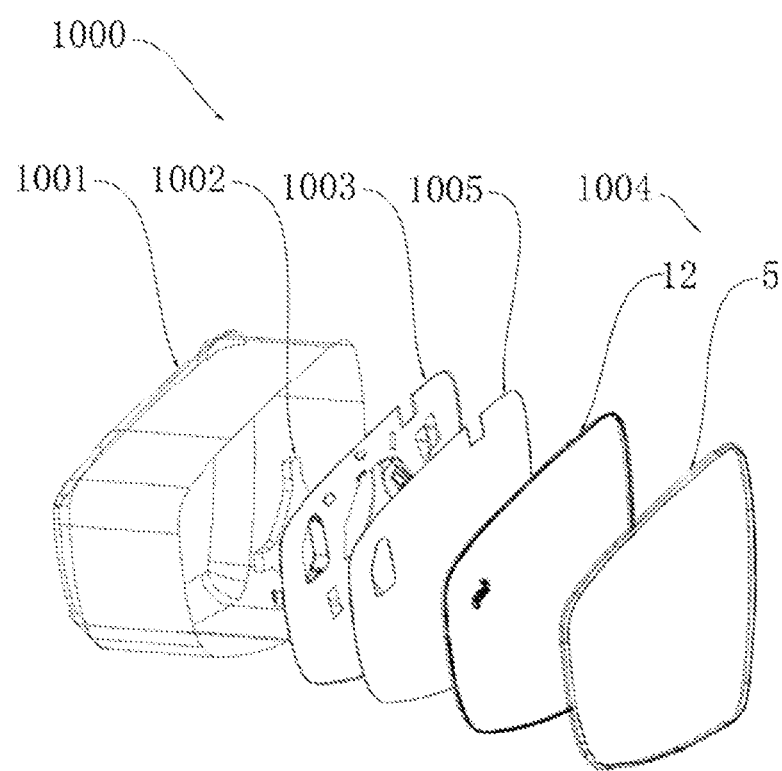
FIG. 1 is an exploded view of an exterior rear-view mirror assembly.

FIG. 1 shows an exterior rear-view mirror assembly of a vehicle. The exterior rear-view mirror assembly 1000 includes a rear cover 1001, a circuit board 1002, a bearing board 1003, a heating plate 1005 and an electrochromic mirror element 1004. The rear cover 1001 is a structural member with a central cavity, the bearing board 1003 and the rear cover 1001 are fixedly connected via mechanical snap fit, and the circuit board 1002 is arranged between the rear cover 1001 and the bearing board 1003. The electrochromic mirror element 1004 includes a substantially transparent electrically conductive substrate 12 and a concave housing 5 covering the electrically conductive substrate 12, a front of the concave housing 5 faces an observer, and a back of the electrically conductive substrate 12 is connected to the heating plate 1005 through gluing, which is in turn glued to the bearing board 1003. The electrochromic mirror element 1004 is electrically connected to the circuit board 1002. After the circuit board 1002 is powered on, the electrochromic mirror element 1004 switches between a colored state and a bleached state under a nominal voltage or different voltages, and the reflectivity of the electrochromic mirror element 1004 changes, thus realizing an anti-glare effect.

Figure 2:
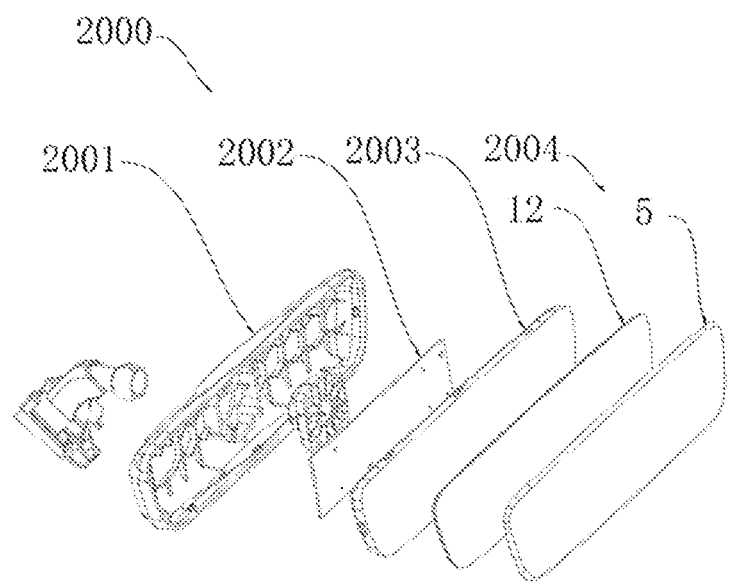
FIG. 2 is an exploded view of an interior rear-view mirror assembly.

FIG. 2 shows an interior rear-view mirror assembly of a vehicle. The interior rear-view mirror assembly 2000 includes a rear cover 2001, a circuit board 2002, a bearing board 2003 and an electrochromic mirror element 2004. The rear cover 2001 is a structural member with a central cavity, the bearing board 2003 and the rear cover 2001 are fixedly connected via mechanical snap fit, and the circuit board 2002 is arranged between the rear cover 2001 and the bearing board 2003. The electrochromic mirror element 2004 includes a substantially transparent electrically conductive substrate 12 and a concave housing 5 covering the electrically conductive substrate 12, a front of the concave housing 5 faces an observer, and a back of the electrically conductive substrate 12 is connected to the bearing board 2003 through gluing. The electrochromic mirror element 2004 is electrically connected to the circuit board 2002. After the circuit board 2002 is powered on, the electrochromic mirror element 2004 switches between a colored state and a bleached state under a nominal voltage or different voltages, and the reflectivity of the electrochromic mirror element 2004 changes, thus realizing an anti-glare effect.

As a further improved technical scheme, the vehicle rear-view mirror assembly may also include at least one of a light source, an interior lighting component, a digital voice processing system, a power supply, a global positioning system, a humidity sensor, an information display, a light sensor, a blind spot lamp, a turn signal lamp, a navigation system, a temperature indicator, a voice control system, a microphone, a remote communication system, a navigation assistant system, a lane departure warning system, a suitable cruise control system, or a vision system.

After describing each possible common structural element in the embodiments, each embodiment will be described individually in detail below.

Figure 3:
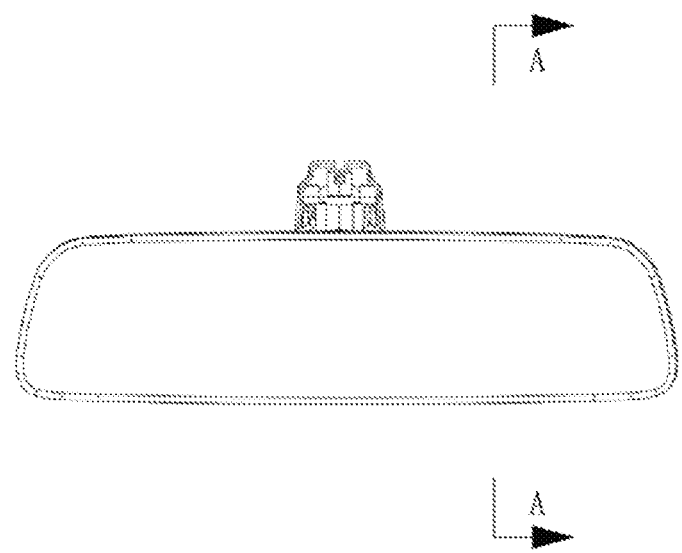
FIG. 3 is a front view of an interior rear-view mirror assembly.
Figure 4:
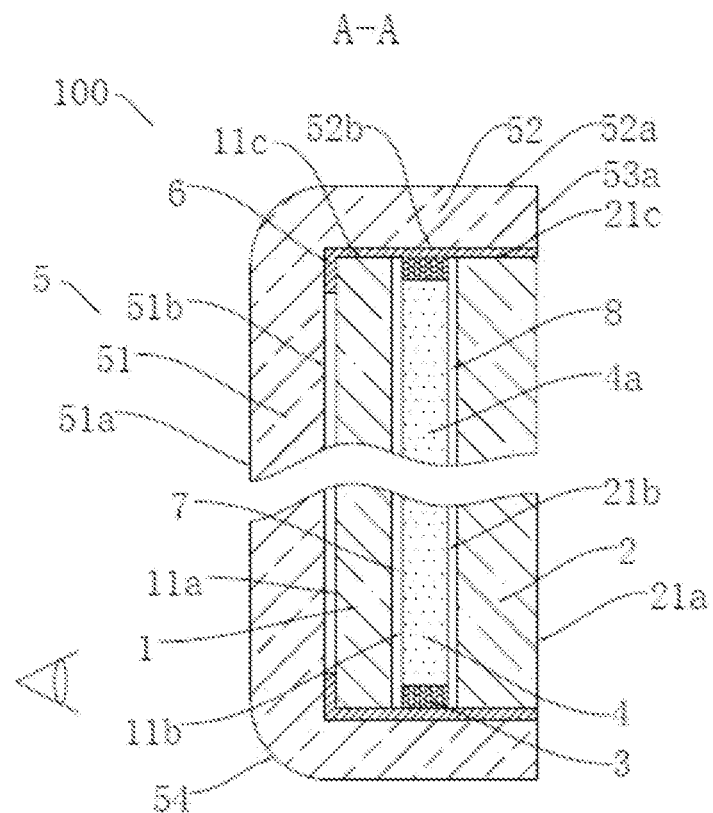
FIG. 4 is a sectional view of a first embodiment including an electrochromic mirror element of the present invention taken along line A-A in FIG. 3.

FIG. 3 is a front view of an interior rear-view mirror assembly. FIG. 4 is a sectional view of an electrochromic mirror element 100 in a first embodiment taken along line A-A in FIG. 3. The electrochromic mirror element 100 includes: a substantially transparent first electrically conductive substrate consisting of a first glass element 1 and a transparent electrically conductive layer 7 deposited on the first glass element 1, where for the convenience of description, a front surface of the first electrically conductive substrate facing the observer is defined as a first surface 11*a*, a rear surface of the first electrically conductive substrate on which the transparent electrically conductive layer 7 is deposited is defined as a second surface 11*b*, and an edge surface adjacent to the first surface 11*a* and the second surface 11*b* is defined as a first edge surface 11*c*; a substantially transparent second electrically conductive substrate consisting of a second glass element 2 and a film layer stack 8 deposited on the second glass element 2, where for the convenience of description, a front surface of the second glass element 2 on which the film layer stack 8 is deposited is defined as a third surface 21*b* (the third surface 21*b* faces the observer), a rear surface of the second glass element 2 is defined as a fourth surface 21*a*, and an edge surface adjacent to the third surface 21*b* and the fourth surface 21*a* is defined as a second edge surface 21*c*, the first electrically conductive substrate and the second electrically conductive substrate are arranged at a distance from each other, the first electrically conductive substrate and the second electrically conductive substrate have basically the same size and area, and their edge surfaces are basically aligned in a circumferential direction, with nearly zero offset; a sealing member 3 arranged substantially in a circumferential direction between outer peripheral areas of the first electrically conductive substrate and the second electrically conductive substrate to hermetically bond the second surface 11*b* to the third surface 21*b* and to define a cavity 4*a*; an electrochromic medium 4 provided in the cavity 4*a*; and a substantially transparent concave housing 5, where also for the convenience of description, a concave bottom edge part of the concave housing 5 parallel to the first surface 11*a* is defined as a housing top 51, a side edge part of the concave housing 5 close to the first edge surface 11*c* and the second edge surface 21*c* is defined as a housing side 52, and the housing top 51 and the housing side 52 are integrally formed, a surface of the housing top 51 facing the observer is defined as an outer top surface 51*a*, a surface of the housing top 51 facing away from the observer is defined as an inner top surface 51*b*, a surface of the housing side 52 facing the observer is defined as an outer side surface 52*a*, and a surface of the housing side 52 facing away from the observer is defined as an inner side surface 52*b*, the inner top surface 51*b* is attached to the first surface 11*a*, the inner side surface 52*b* completely covers the first edge surface 11*c* and the second edge surface 21*c* and is attached to the first edge surface 11*c* and the second edge surface 21*c*, and an end face 53*a* of the housing side 52 of the concave housing 5 is flush with the fourth surface 21*a* of the second electrically conductive substrate 2; and a shielding layer 6 is arranged along an outer peripheral area of the housing top 51 and along the housing side 52, and the sealing member 3 is hidden behind the shielding layer 6 when viewed from the outer top surface 51*a* and the outer side surface 52*a*. A medium by which the inner top surface 51*b* is attached to the first surface 11*a* is a substantially transparent adhesive. A medium by which the inner side surface 52*b* is attached to the first edge surface 11*c* and the second edge surface 21*c* is a high-performance adhesive. The concave housing 5 is made of a substantially transparent resin material, so that the danger, caused by glass breakage, to people inside the vehicle when the rear-view mirror assembly is subjected to an external impact can be avoided. In addition, when the shielding layer 6 is arranged on the outer peripheral area of the inner top surface 51*b* of the housing top 51 and the inner side surface 52*b* of the housing side 52, the substantially transparent housing top 51 and housing side 52 bring a better visual experience to the observer.

As a preferred embodiment, the concave housing 5 also has a curved peripheral edge 54 with a radius greater than 2.5 mm on an outer surface near the outer peripheral area.

Figure 5:
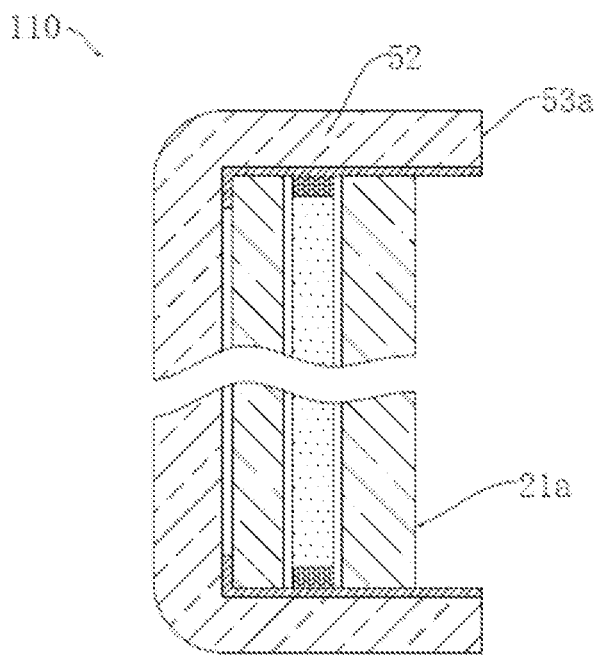
FIG. 5 is a sectional view of a second embodiment after modification to the embodiment of FIG. 4.

As a preferred embodiment, as shown in FIG. 5, the electrochromic mirror element 110 of this embodiment is basically the same as that of the first embodiment in FIG. 4 in terms of structural arrangement, except that the end face 53*a* of the housing side 52 of the concave housing 5 in this embodiment extends outward and at least partially exceeds the fourth surface 21a of the second electrically conductive substrate. The structural arrangement of this embodiment can provide a contact area between the inner side surface 52b and the end surface 53a of the housing side 52 and the bearing board, thus effectively ensuring the connection between the concave housing 5 and the bearing board.

Figure 6:
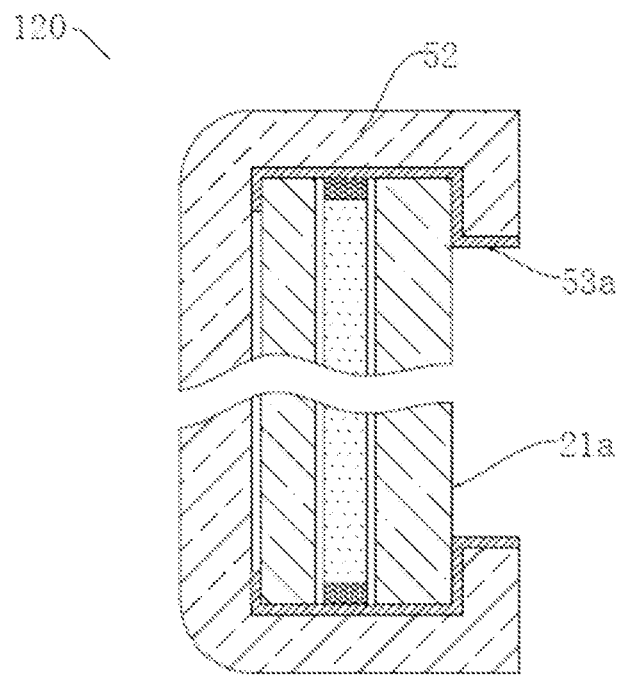
FIG. 6 is a sectional view of a third embodiment after modification to the embodiment of FIG. 5.

As a preferred embodiment, as shown in FIG. 6, the electrochromic mirror element 120 of this embodiment is basically the same as that of the embodiment in FIG. 5 in terms of structural arrangement, except that the end face 53a of the housing side 52 of the concave housing 5 in this embodiment extends outward and at least partially covers an outer peripheral area of the fourth surface 21a of the second electrically conductive substrate. The structural arrangement of this embodiment can further ensure that the concave housing 5 surrounds the electrically conductive substrate, so that the integrity of the concave housing 5 and the electrically conductive substrate is better, and the housing side 52 of the concave housing 5 is prevented from warping or falling off.

Figure 7:
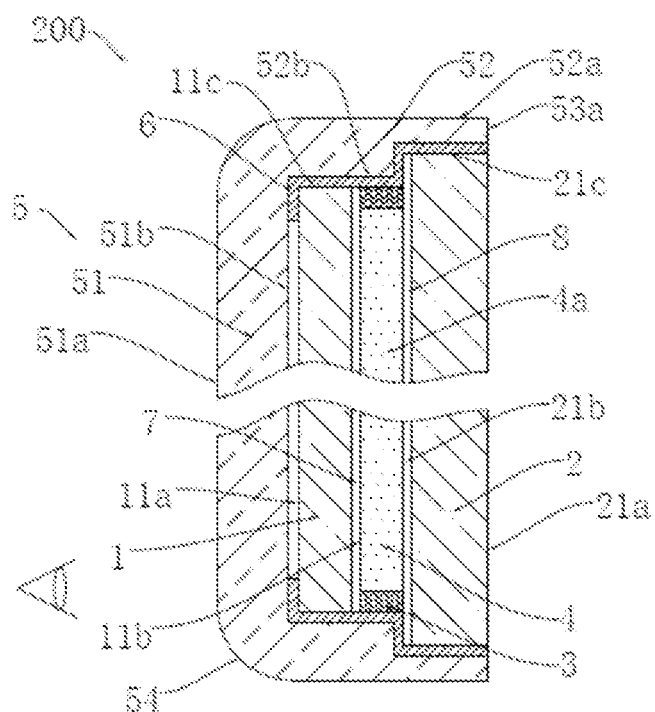
FIG. 7 is a sectional view of a fourth embodiment including an electrochromic mirror element of the present invention.
Figure 18:
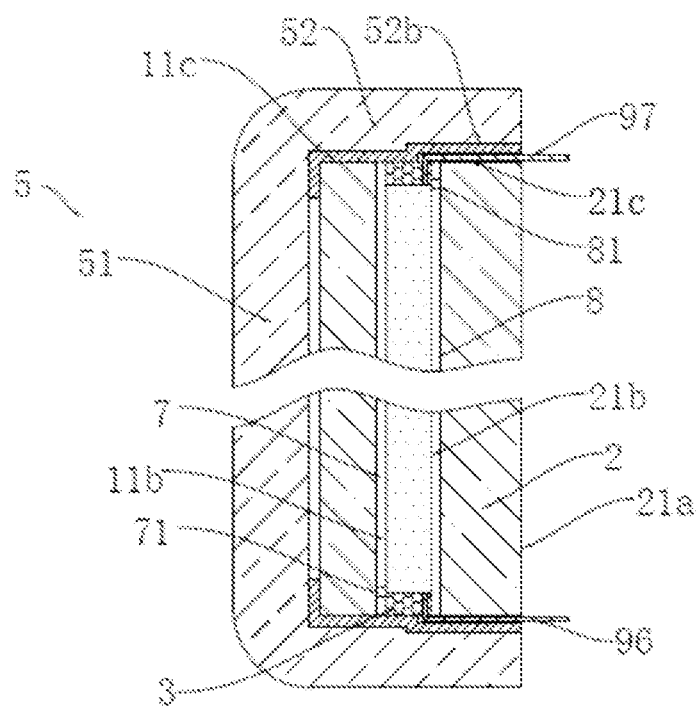
FIG. 18 is a sectional view of a fourth electrode lead-out method adopted in the embodiments of FIGS. 4-14.
Figure 19:
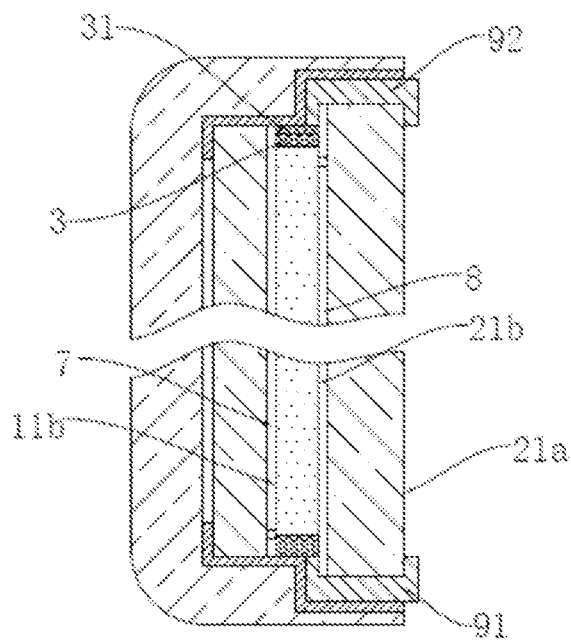
FIG. 19 is a sectional view of another embodiment of a detachable electrode lead-out method adopted in the embodiments of FIGS. 7-9.

FIG. 7 shows a sectional view of an electrochromic mirror element of a fourth embodiment of the present invention. In order to avoid repetitive description, surface definition and identification of each component in the electrochromic mirror element 200 of this embodiment are the same as those of the first embodiment. The electrochromic mirror element 200 includes: a substantially transparent first electrically conductive substrate consisting of a first glass element 1 and a transparent electrically conductive layer 7 deposited on the first glass element 1; a substantially transparent second electrically conductive substrate consisting of a second glass element 2 and a film layer stack 8 deposited on the second glass element 2, where the first electrically conductive substrate and the second electrically conductive substrate are arranged at a distance from each other, and the size and area of the first electrically conductive substrate are smaller than those of the second electrically conductive substrate; a sealing member 3 arranged substantially in a circumferential direction between outer peripheral areas of the first electrically conductive substrate and the second electrically conductive substrate to hermetically bond the second surface 11b to the third surface 21b and to define a cavity 4a; an electrochromic medium 4 provided in the cavity 4a; and a substantially transparent concave housing 5 including a housing top 51 and a housing side 52 which are integrally formed, where the inner top surface 51b is attached to the first surface 11a, the inner side surface 52b completely covers the first edge surface 11c and the second edge surface 21c and is attached to the first edge surface 11c and the second edge surface 21c, the end face 53a of the housing side 52 of the concave housing 5 is flush with the fourth surface 21a of the second electrically conductive substrate 2, a shielding layer 6 is arranged along the outer peripheral area of the housing top 51 and the housing side 52, and the sealing member 3 is hidden behind the shielding layer 6 when viewed from the outer top surface 51a and the outer side surface 52a. A medium by which the inner top surface 51b is attached to the first surface 11a is a substantially transparent adhesive. A medium by which the inner side surface 52b is attached to the first edge surface 11c and the second edge surface 21c is a high-performance adhesive. Compared with the previous embodiments, the size and area of the first electrically conductive substrate of this embodiment are smaller than those of the second electrically conductive substrate, and the second edge surface 21c of the second electrically conductive substrate exceeds the first edge surface 11c of the first electrically conductive substrate. This structural arrangement allows more flexible electrode lead-out, which can be realized by adopting the electrode lead-out method shown in FIGS. 15-18, or by optimizing FIG. 16, that is, a detachable electrode can be arranged without thinning the peripheral area of the third surface 21b. Specifically, as shown in FIG. 19, one end of a first electrically conductive clip 91 detachably extends to the third surface 21b and makes contact with the film layer stack 8 to form an electrical connection, while the other end of the first electrically conductive clip 91 extends to part of the peripheral area on the fourth surface 21a; and one end of a second electrically conductive clip 92 detachably extends to the third surface 21b, and is electrically connected to the transparent electrically conductive layer 7 on the second surface 11b through an electrically conductive block 31, the electrically conductive block 31 is at least partially buried in the sealing member 3 and partially exposed out of the sealing member 3 to make electrical contact with the second electrically conductive clip, and the other end of the second electrically conductive clip 92 extends to part of the peripheral area on the fourth surface 21a.

As a preferred embodiment, the concave housing 5 also has a curved peripheral edge 54 with a radius greater than 2.5 mm on an outer surface near the outer peripheral area.

Figure 8:
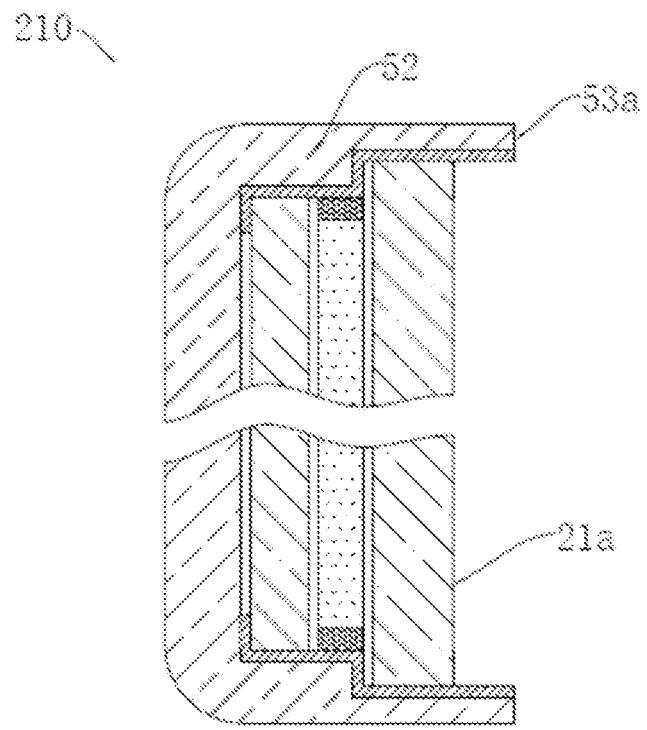
FIG. 8 is a sectional view of a fifth embodiment after modification to the embodiment of FIG. 7.

As a preferred embodiment, as shown in FIG. 8, the electrochromic mirror element 210 of this embodiment is basically the same as that of the embodiment in FIG. 7 in terms of structural arrangement, except that the end face 53a of the housing side 52 of the concave housing 5 in this embodiment extends outward and at least partially exceeds the fourth surface 21a of the second electrically conductive substrate.

Figure 9:
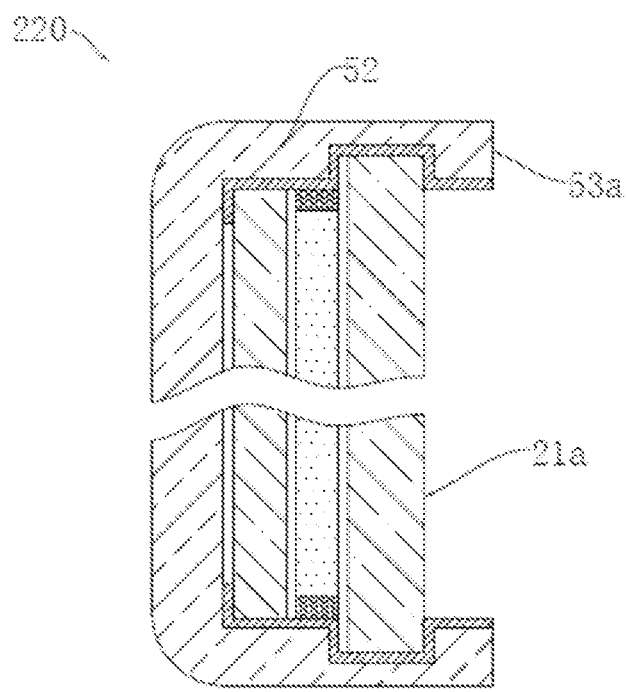
FIG. 9 is a sectional view of a sixth embodiment after modification to the embodiment of FIG. 8.

As a preferred embodiment, as shown in FIG. 9, the electrochromic mirror element 220 of this embodiment is basically the same as that of the embodiment in FIG. 8 in terms of structural arrangement, except that the end face 53a of the housing side 52 of the concave housing 5 in this embodiment extends outward and at least partially covers an outer peripheral area of the fourth surface 21a of the second electrically conductive substrate.

Figure 10:
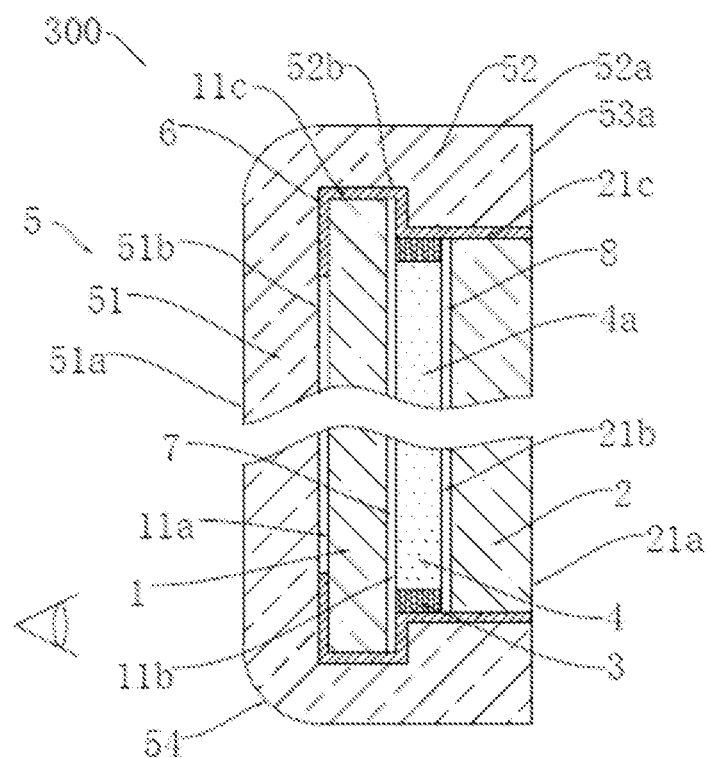
FIG. 10 is a sectional view of a seventh embodiment including an electrochromic mirror element of the present invention.

FIG. 10 shows a sectional view of an electrochromic mirror element of a seventh embodiment of the present invention. In order to avoid repetitive description, surface definition and identification of each component in the electrochromic mirror element 300 of this embodiment are the same as those of the first embodiment. The electrochromic mirror element 300 includes: a substantially transparent first electrically conductive substrate consisting of a first glass element 1 and a transparent electrically conductive layer 7 deposited on the first glass element 1; a substantially transparent second electrically conductive substrate consisting of a second glass element 2 and a film layer stack 8 deposited on the second glass element 2, where the first electrically conductive substrate and the second electrically conductive substrate are arranged at a distance from each other, and the size and area of the first electrically conductive substrate are greater than those of the second electrically conductive substrate; a sealing member 3 arranged substantially in a circumferential direction between outer peripheral areas of the first electrically conductive substrate and the second electrically conductive substrate to hermetically bond the second surface 11b to the third surface 21b and to define a cavity 4a; an electrochromic medium 4 provided in the cavity 4a; and a substantially transparent concave housing 5 including a housing top 51 and a housing side 52 which are integrally formed, where the inner top surface 51b is attached to the first surface 11a, the inner side surface 52b completely covers the first edge surface 11c and the second edge surface 21c and is attached to the first edge surface 11c and the second edge surface 21c, the end face 53a of the housing side 52 of the concave housing 5 is flush with the fourth surface 21a of the second electrically conductive substrate 2, a shielding layer 6 is arranged along the outer peripheral area of the housing top 51 and the housing side 52, and the sealing member 3 is hidden behind the shielding layer 6 when viewed from the outer top surface 51a and the outer side surface 52a. A medium by which the inner top surface 51b is attached to the first surface 11a is a substantially transparent adhesive. A medium by which the inner side surface 52b is attached to the first edge surface 11c and the second edge surface 21c is a high-performance adhesive. Compared with the previous embodiments, the size and area of the first electrically conductive substrate of this embodiment are greater than those of the second electrically conductive substrate, and the first edge surface 11c of the first electrically conductive substrate exceeds the second edge surface 21c of the second electrically conductive substrate. This structural arrangement provides another way for electrode lead-out to be implemented. Specifically, in this embodiment, one end of a second electrode lead 97 in FIG. 18 is arranged on the second surface 11b in an overhanging manner and makes electrical contact with the transparent electrically conductive layer 7, and the other end extends out of the fourth surface 21a through the electrode lead-out channel. The other electrode is led out in the same way as a first electrode lead 96 in FIG. 18.

As a preferred embodiment, the concave housing 5 also has a curved peripheral edge 54 with a radius greater than 2.5 mm on an outer surface near the outer peripheral area.

Figure 11:
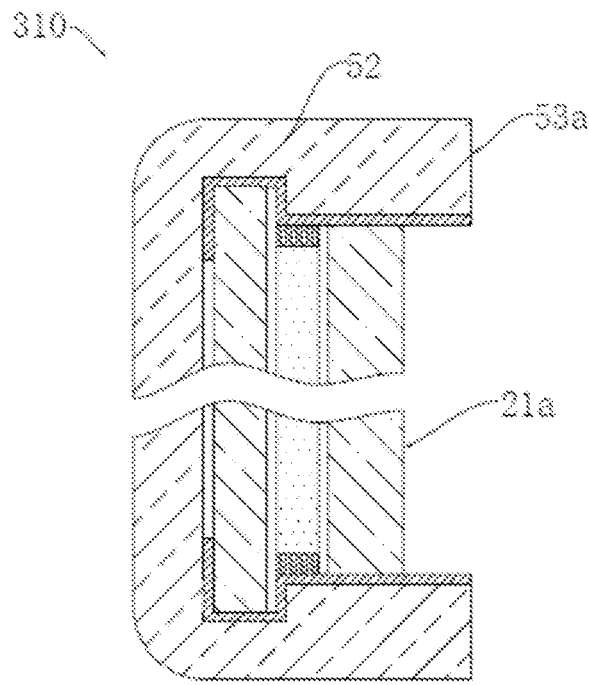
FIG. 11 is a sectional view of an eighth embodiment after modification to the embodiment of FIG. 10.

As a preferred embodiment, as shown in FIG. 11, the electrochromic mirror element 310 of this embodiment is basically the same as that of the embodiment in FIG. 10 in terms of structural arrangement, except that the end face 53a of the housing side 52 of the concave housing 5 in this embodiment extends outward and at least partially exceeds the fourth surface 21a of the second electrically conductive substrate.

Figure 12:
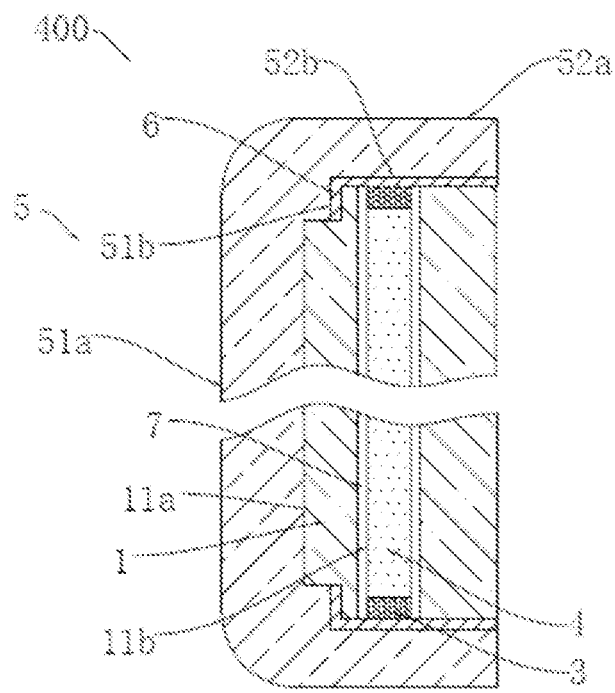
FIG. 12 is a sectional view of a ninth embodiment after modification to the embodiment of FIG. 4.

As shown in FIG. 12, as an alternative technical scheme, in at least one embodiment, the electrochromic mirror element 400 also includes a substantially transparent first electrically conductive substrate, a substantially transparent second electrically conductive substrate, a sealing member 3, an electrochromic medium 4 and a substantially transparent concave housing 5. The first electrically conductive substrate of the electrochromic mirror element consists of a first glass element 1 and a transparent electrically conductive layer 7 deposited on a second surface 11b of the first glass element 1. A peripheral area of the first surface 11a of the first glass element 1 is thinned by chemical etching or physical grinding. A shielding layer 6 is arranged along the outer peripheral area of the inner top surface 51b and along the inner side surface 52b, and the outer peripheral area is arranged corresponding to the thinned area. When viewed from the outer top surface 51a and the outer side surface 52a, the sealing member 3 is hidden behind the shielding layer 6. By the thinning treatment of the first glass element 1, the width of the shielding layer 6 on the outer peripheral area can be reduced, thereby enlarging an observation area of a middle visual area of the electrochromic mirror element.

Figure 13:
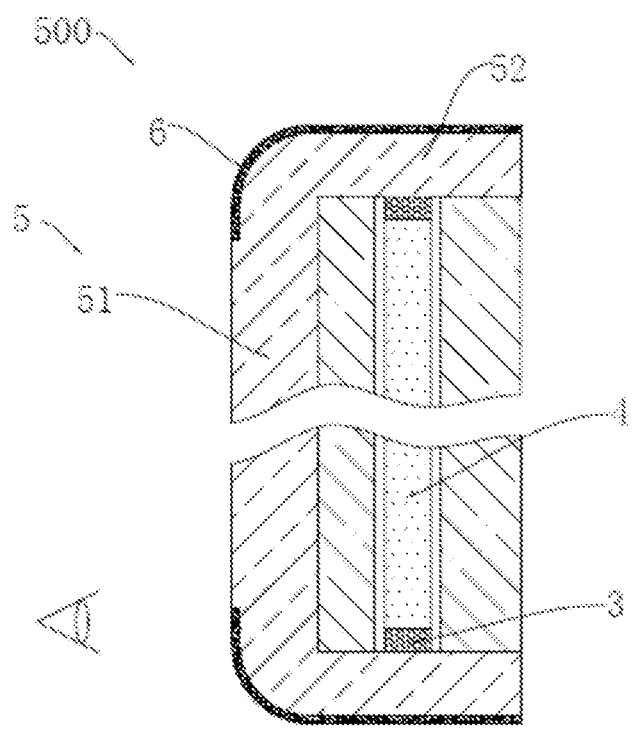
FIG. 13 is a diagram of an embodiment as an alternative to the embodiments of FIGS. 4-12.

As shown in FIG. 13, as an alternative to the above embodiments, in at least one embodiment, the electrochromic mirror element 500 also includes a substantially transparent first electrically conductive substrate, a substantially transparent second electrically conductive substrate, a sealing member 3, an electrochromic medium 4 and a substantially transparent concave housing 5. The shielding layer 6 of the electrochromic mirror element is a semi-transparent physical layer with an uneven surface formed on the outer peripheral area of the housing top 51 of the concave housing 5 and an inner or outer surface of the housing side 52. The semi-transparent physical layer is obtained after surface treatment such as mechanical sand blasting, manual grinding or chemical corrosion. In this embodiment, the shielding layer 6 is formed by surface treatment of some areas of the concave housing, so there is no need to arrange an additional film layer to serve as a shielding layer, and the technical effect that the sealing element 3 and the electrode are hidden and cannot be detected when viewed from an outer surface of the concave housing 5 can also be achieved, thus effectively reducing the production cost and manufacturing difficulty of the electrochromic mirror element. In order to further optimize the electrochromic mirror element, a thin concave housing 5 may be used.

Figure 14:
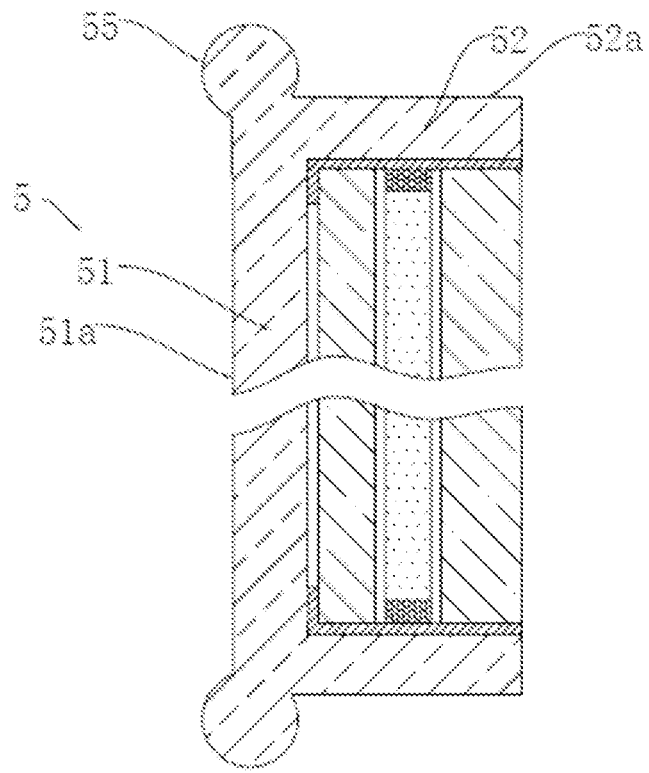
FIG. 14 is a diagram of an embodiment as an alternative to the embodiments of FIGS. 4-13.

As shown in FIG. 14, as an improved technical scheme of the above embodiments, in at least one embodiment, the concave housing 5 has a rounded peripheral corner 55 with a radius greater than 2.5 mm on the outer surface near the outer peripheral area, and the rounded peripheral corner 55 extends circumferentially along the housing top 51 of the concave housing 5. The rounded peripheral corner 55 is convex, that is, when viewed from the outside of the concave housing, a topmost end of the rounded peripheral corner 55 not only exceeds the outer side surface 52a of the housing side 52 but also exceeds the outer top surface 51a of the housing top 51. The rounded peripheral corner 55 is integrally molded with the housing top 51 and the housing side 52. The design of the rounded peripheral corner 55 allows plastic parts at a rear end of the rear-view mirror assembly to be visually and partially hidden when the electrochromic mirror element is assembled in the rear-view mirror assembly, so that the whole rear-view mirror assembly looks more pleasing.

When those of ordinary skill in the art adopt the electrochromic mirror element structure as described in detail in the above embodiments and install it into the rear-view mirror housing to form a complete rear-view mirror with an electrochromic function, they still need to know clearly the implementable materials of the components of the electrochromic mirror element and the electrode lead-out way of the electrochromic mirror element. Meanwhile, in order to provide clear description and avoid too much discussion about the materials of the components and electrode lead-out way of the electrochromic mirror, the inventors provide detailed description below.

The first glass element 1 and the second glass element 2 may be selected from ordinary electronic grade float soda lime glass or medium silica aluminum glass or high silica aluminum glass or high borosilicate glass. The first glass element 1 and the second glass element 2 are colorless or light-colored glass. The thicknesses of the first glass element 1 and the second glass element 2 are 0.2-3 mm, more preferably 0.5-2 mm.

In at least one embodiment, the substantially transparent first electrically conductive substrate and the substantially transparent second electrically conductive substrate may be selected from a colorless or light-colored transparent polymer material to replace the colorless or light-colored first glass element 1 and second glass element 2.

The transparent electrically conductive layer 7 may be selected from at least one of $SnO_2$ doped with fluorine, or ZnO, $SnO_2$, $In_2O_3$, $TiO_2$, $HfO_2$ or CuO doped with metal ions, where the metal ions are at least one of $Mg^{2+}$, $Al^{3+}$, $Ga^{3+}$, $Sb^{3+}$, $Nb^{4+}$, $Ge^{3+}$, or $Zr^{4+}$.

The transparent electrically conductive layer 7 may also adopt a composite film layer structure in the form of a metal oxide/metal/metal oxide film layer, the metal oxide is at least one of $Nb_2O_5$, $Ta_2O_5$, $TiO_2$, $WO_3$, $ZnO$, $Al_2O_3$, $SnO_2$, $SiO_2$, or $ZrO_2$, and the metal is one of Al, Ag, Cu, Ir, Ni, Ti, Pb, Pt, Ru or Rh or an alloy material of one or more of Al, Ag, Cu, Ir, Ni, Ti, Pb, Pt, Ru or Rh. The transparent electrically conductive layer 7 may be prepared by physical vapor deposition methods such as vacuum evaporation or magnetron sputtering.

The film layer stack 8 includes a reflective layer and an electrically conductive layer. The reflective layer is at least one of a metal film layer or a metal oxide film layer, the metal film layer is one of Al, Ag, Cr, Cu, Ir, Ni, Ti, Pb, Pt, Ru or Rh or an alloy material of one or more of Al, Ag, Cr, Cu, Ir, Ni, Ti, Pb, Pt, Ru or Rh, and the metal oxide film layer structure is a high/low/high refractive index film layer, where the high refractive index film layer material is one of $Nb_2O_5$, $Ta_2O_5$, $TiO_2$ or $ZrO_2$, and the low refractive index film layer material is $SiO_2$ or $MgF_2$. The electrically conductive layer may be selected from at least one of $SnO_2$ doped with fluorine, or ZnO, $SnO_2$, $In_2O_3$, $TiO_2$, $HfO_2$ or CuO doped with metal ions, where the metal ions are at least one of $Mg^{2+}$, $Al^{3+}$, $Ga^{3+}$, $Sb^{3+}$, $Nb^{4+}$, $Ge^{3+}$, or $Zr^{4+}$. The electrically conductive layer may also adopt a composite film layer structure in the form of a metal oxide/metal/metal oxide film layer, the metal oxide is at least one of $Nb_2O_5$, $Ta_2O_5$, $TiO_2$, $WO_3$, $ZnO$, $Al_2O_3$, $SnO_2$, $SiO_2$, or $ZrO_2$, and the metal is one of Al, Ag, Cu, Ir, Ni, Ti, Pb, Pt, Ru or Rh or an alloy material of one or more of Al, Ag, Cu, Ir, Ni, Ti, Pb, Pt, Ru or Rh. The film layer stack 8 may be prepared by physical vapor deposition methods such as vacuum evaporation or magnetron sputtering.

The shielding layer 6 provided in FIGS. 4-12 and FIG. 14 is a film layer deposited on the outer peripheral area of the housing top 51 and the housing side 52. The film layer is at least one of Ag, Ti, Al, Cr, Ni, Mo, Ru, Rh, Ir, Pd, or Pt, and may be prepared by physical vapor deposition methods such as vacuum evaporation or magnetron sputtering, or chemical plating methods. The shielding layer obtained by the above physical vapor deposition methods allows the sealing element and the electrode arranged on the electrically conductive substrate to be hidden, so that the whole rear-view mirror assembly looks more appealing.

The concave housing 5 is made of substantially transparent resin. The substantially transparent resin is a colorless or light-colored transparent polymer material, which may specifically be at least one of acrylic resin, polycarbonate, polyimide, silicone resin, crosslinked transparent polyurethane or polyvinyl chloride, which is transparent intrinsically or becomes transparent after modification. The housing top 51 of the concave housing 5 has a thickness of 0.5-5 mm, preferably 1-3 mm.

The sealing member 3 is an epoxy adhesive, and more preferably, an epoxy adhesive containing aromatic amino compounds, cyanate resin compounds or anhydride compounds as curing agents.

The high-performance adhesive may be at least one of an organic adhesive or an inorganic adhesive. The organic adhesive is at least one of epoxy adhesive, phenolic adhesive, polyurethane adhesive, organic silica gel adhesive, or cyanoacrylic adhesive. The inorganic adhesive is at least one of silicate inorganic adhesives, phosphate inorganic adhesives, sulfate inorganic adhesives, or borate inorganic adhesives.

The substantially transparent adhesive is one of PVB adhesives, acrylic adhesives, polyurethane adhesives, organosilicone adhesives or epoxy adhesives.

The electrochromic medium 4 is a solution containing an anode electroactive material and a cathode electroactive material. The anode electroactive material is selected from at least one of triphenylamine, substituted triphenylamine, ferrocene, substituted ferrocene, ferrocene salt, substituted ferrocene salt, phenothiazine, substituted phenothiazine, thiazine, substituted thiazine, phenazine, or substituted phenazine. The cathode electroactive material is selected from at least one of viologen, substituted viologen, anthraquinone, or substituted anthraquinone.

Figure 15:
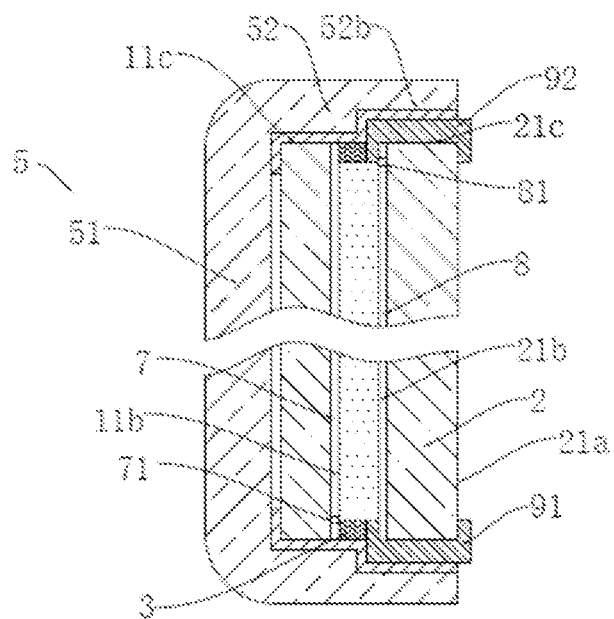
FIG. 15 is a sectional view of a first electrode lead-out method adopted in the embodiments of FIGS. 4-14.

As shown in FIG. 15, in at least one embodiment, at least part of the area between the inner side surface 52b of the concave housing 5 and the second edge surface 21c is provided with an electrode lead-out channel, and the electrode is clamped on the second electrically conductive substrate with a U-shaped electrically conductive clip, which includes a first electrically conductive clip 91 and a second electrically conductive clip 92. One end of the first electrically conductive clip 91 extends to part of the outer peripheral area on the third surface 21b, makes contact with the film layer stack 8 on the third surface 21b to form an electrical connection, and also at least partially extends into the sealing member 3 and is fixed there. The other end of the first electrically conductive clip 91 extends to part of the outer peripheral area on the fourth surface 21a, and further passes an electrically conductive wiring harness (not shown) arranged at this position and needed for electrical connection with the circuit board. In addition, at least part of the transparent electrically conductive layer 7 deposited on the second surface 11b is etched or masked to form a first non-electrically conductive area 71, so as to electrically insulate the first electrically conductive substrate from the second electrically conductive substrate. Moreover, one end of the second electrically conductive clip 92 extends to part of the outer peripheral area on the third surface 21b, and makes contact with the transparent electrically conductive layer 7 on the second surface 11b to form an electrical connection. One end of the second electrically conductive clip 92 at least partially extends into the sealing member 3 and is fixed there. The other end of the second electrically conductive clip 92 extends to part of the outer peripheral area on the fourth surface 21a, and further passes an electrically conductive wiring harness (not shown) arranged at this position and needed for electrical connection with the circuit board. In addition, at least part of the film layer stack 8 deposited on the third surface 21b is etched or masked to form a second non-electrically conductive area 81, so as to electrically insulate the first electrically conductive substrate from the second electrically conductive substrate. After the U-shaped electrically conductive clip in this embodiment is assembled, it is also necessary to spot-weld at least one electrode lead onto a surface of the electrically conductive clip extending to the fourth surface 21a to be electrically connected to an electrode lead from the circuit board.

As an alternative embodiment, one end of the second electrically conductive clip 92 extends to part of the outer peripheral area on the third surface 21b, instead of directly making contact with the transparent electrically conductive layer 7 on the second surface 11b to form an electrical connection, and the second electrically conductive clip 92 and the transparent electrically conductive layer 7 are electrically connected by arranging electrically conductive silver paste which is arranged at a position where the electrode lead-out channel communicates with the transparent electrically conductive layer, that is, the communication position of the first edge surface 11c, the second edge surface 21c and an outer surface of the sealing member 3. Further, the transparent electrically conductive layer 7 extends from the second surface 11b to the first edge surface 11c to increase an electrical contact area between the second electrically conductive clip 92 and the transparent electrically conductive layer 7.

Figure 16:
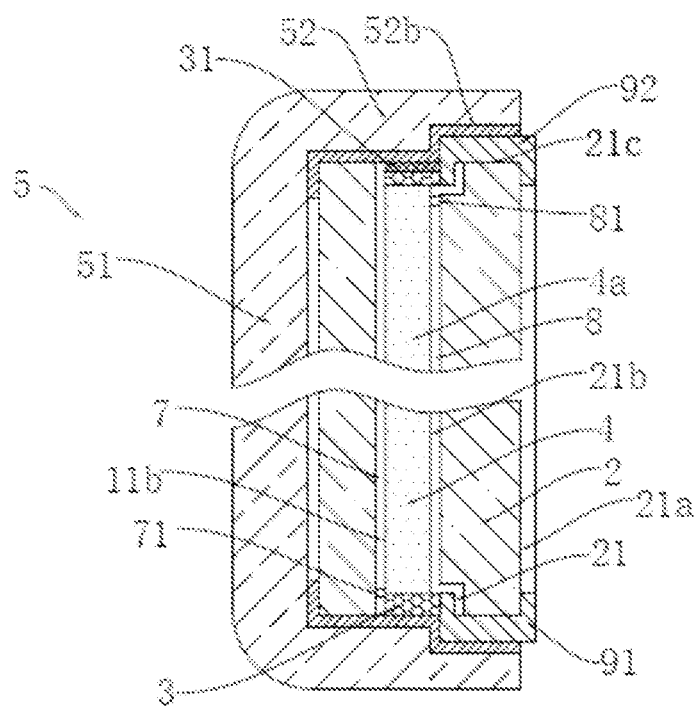
FIG. 16 is a sectional view of a second electrode lead-out method adopted in the embodiments of FIGS. 4-14.

As shown in FIG. 16, as an improved technical scheme, in at least one embodiment, at least part of an area between the inner side surface 52b of the concave housing 5 and the second edge surface 21c is provided with an electrode lead-out channel, and the electrode is detachably connected to the second electrically conductive substrate with a U-shaped electrically conductive clip, which includes a first electrically conductive clip 91 and a second electrically conductive clip 92. The second electrically conductive substrate of the electrochromic mirror element consists of the second glass element 2 and the film layer stack 8 deposited on the third surface 21b of the second glass element 2. Part of the peripheral area of the third surface 21b of the second glass element 2 is thinned to form a groove 21, so as to define a space which can receive the thickness of the housing side 52 at one end of the U-shaped electrically conductive clip. The thinning may be achieved by chemical etching or physical grinding. The width of the thinned peripheral area of the third surface 21b is smaller than or equal to the width of the sealing member 3 in this peripheral area, so as to prevent the electrochromic medium 4 from leaking out of the cavity 4a from the groove 21 which may affect the normal operation of the electrochromic mirror. The film layer stack 8 is deposited on the third surface 21b and extends into the groove 21 after thinning treatment, thereby providing an effective contact area between the U-shaped electrically conductive clip and the film layer stack 8, and the U-shaped electrically conductive clip is closely matched with the groove 21, thus effectively ensuring the electrical connection between the film layer stack 8 and the U-shaped electrically conductive clip. One end of the first electrically conductive clip 91 extends to the groove 21 on the third surface 21b, and makes contact with the film layer stack 8 on the groove 21 to form an electrical connection. The other end of the first electrically conductive clip 91 extends to part of the outer peripheral area on the fourth surface 21a, and further passes an electrically conductive wiring harness (not shown) arranged at this position and needed for electrical connection with the circuit board. In addition, at least part of the transparent electrically conductive layer 7 deposited on the second surface 11b is etched or masked to form a first non-electrically conductive area 71, so as to electrically insulate the first electrically conductive substrate from the second electrically conductive substrate. Moreover, one end of the second electrically conductive clip 92 extends to the groove 21 on the third surface 21b, and is electrically connected with the transparent electrically conductive layer 7 on the second surface 11b through the electrically conductive block 31, which is at least partially buried in the sealing member 3 to be better fixed between the second surface 11b and the third surface 21b, thus effectively ensuring the electrical connection between the second electrically conductive clip 92 and the transparent electrically conductive layer 7. The other end of the second electrically conductive clip 92 extends to part of the outer peripheral area on the fourth surface 21a, and further passes an electrically conductive wiring harness (not shown) arranged at this position and needed for electrical connection with the circuit board. In addition, at least part of the film layer stack 8 deposited on the third surface 21b is etched or masked to form a second non-electrically conductive area 81, so as to electrically insulate the first electrically conductive substrate from the second electrically conductive substrate. The electrically conductive block may use at least one of copper, silver, nickel or other electrically conductive metal or alloys thereof as an electrically conductive component. After the U-shaped electrically conductive clip in this embodiment is assembled, it is also necessary to spot-weld at least one electrode lead onto a surface of the electrically conductive clip extending to the fourth surface 21a to be electrically connected to an electrode lead from the circuit board. According to the improved electrode lead-out method, the U-shaped electrically conductive clip can be flexibly disassembled at the groove 21 through the first electrically conductive clip 91 and the second electrically conductive clip 92, instead of being fixed on the second electrically conductive substrate by the sealing member 3 and unable to be disassembled, or the U-shaped electrically conductive clip does not need to be fixed on the second electrically conductive substrate when the sealing member 3 is coated, but can be assembled flexibly and quickly in batches after the whole sealing member 3 is coated and cured. This technical concept makes the assembly and replacement of the lead-out electrode of the electrochromic mirror more convenient and flexible, and makes it possible to replace a damaged electrode.

Figure 17:
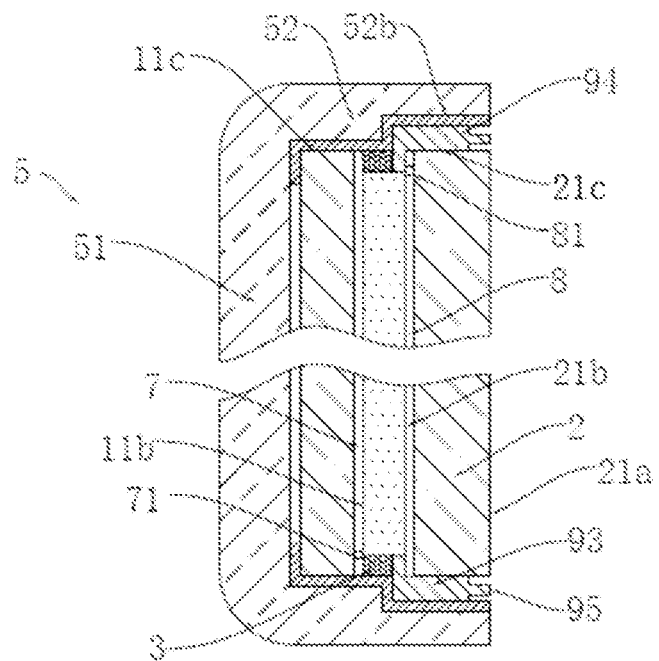
FIG. 17 is a sectional view of a third electrode lead-out method adopted in the embodiments of FIGS. 4-14.

As shown in FIG. 17, as an improved technical scheme, in at least one embodiment, at least part of the area between the inner side surface 52b of the concave housing 5 and the second edge surface 21c is provided with an electrode lead-out channel, and the electrode is arranged on the second electrically conductive substrate in the form of an L-shaped electrode strip. Specifically, the L-shaped electrode strip includes a first electrode strip 93 and a second electrode strip 94, and one end of the first electrode strip 93 extends to part of the outer peripheral area on the third surface 21b, is in contact with the film layer stack 8 on the third surface 21b to form an electrical connection, and also at least partially extends into the sealing member 3 and is fixed there. The other end of the first electrode strip 93 is provided with a plurality of bus plugs 95 protruding side by side, which extend in the electrode lead-out channel without completely exceeding the fourth surface 21a, or continue to extend outward beyond the fourth surface 21a to be totally exposed. The bus plug 95 is quickly plugged into a socket (not shown) led out from the circuit board to form an electrical connection. The socket is provided with a plurality of side-by-side concave parts which are in friction fit with convex parts of the bus plug 95. In addition, at least part of the transparent electrically conductive layer 7 deposited on the second surface 11b is etched or masked to form the first non-electrically conductive area 71, so as to electrically insulate the first electrically conductive substrate from the second electrically conductive substrate. Moreover, one end of the second electrode strip 94 extends to part of the outer peripheral area on the third surface 21b, and makes contact with the transparent electrically conductive layer 7 on the second surface 11b to form an electrical connection. One end of the second electrode strip 94 at least partially extends into the sealing member 3 and is fixed there, the other end of the second electrode strip 94 is arranged in the same way as the first electrode strip 93, and electrical connection is realized through quick plugging. In addition, at least part of the film layer stack 8 deposited on the third surface 21b is etched or masked to form the second non-electrically conductive region 81, so as to electrically insulate the first electrically conductive substrate from the second electrically conductive substrate. The L-shaped electrode strip has a plurality of side-by-side convex bus plugs 95 arranged at one end close to the first surface 11*a*, so as to be quickly plugged in the socket led from the circuit board to realize quick assembly and electrical connection; besides, through the friction fit between the bus plug 95 and a plurality of side-by-side electrical contacts on the socket, the electrical connection of the electrode lead is more reliable, thus ensuring the long-term stable operation of the electrochromic mirror element.

As an alternative embodiment, one end of the second electrode strip 94 extends to part of the outer peripheral area on the third surface 21*b*, instead of directly making contact with the transparent electrically conductive layer 7 on the second surface 11*b* to form an electrical connection, and the second electrically conductive clip 94 and the transparent electrically conductive layer 7 are electrically connected by arranging electrically conductive silver paste which is arranged at a position where the electrode lead-out channel communicates with the transparent electrically conductive layer, that is, the communication position of the first edge surface 11*c*, the second edge surface 21*c* and an outer surface of the sealing member 3. Further, the transparent electrically conductive layer 7 extends from the second surface 11*b* to the first edge surface 11*c* to increase an electrical contact area between the second electrode strip 94 and the transparent electrically conductive layer 7.

As shown in FIG. 18, as an improved technical scheme, in at least one embodiment, at least part of the area between the inner side surface 52*b* of the concave housing 5 and the second edge surface 21*c* is provided with an electrode lead-out channel, through which one end of the electrode extends outward and the other end is fixed in the sealing member 3. Specifically, the electrode includes a first electrode lead 96 and a second electrode lead 97, and one end of the first electrode lead 96 extends to part of the outer peripheral area on the third surface 21*b*, is fixed in the sealing member 3, and makes contact with the film layer stack 8 on the third surface 21*b* to form electrical communication. The other end of the first electrode lead 96 extends outward through the electrode lead-out channel, and is electrically connected to the electrode wiring harness led from the circuit board. In addition, at least part of the transparent electrically conductive layer 7 deposited on the second surface 11*b* is etched or masked to form the first non-electrically conductive region 71, so as to electrically insulate the first electrically conductive substrate from the second electrically conductive substrate. Moreover, one end of the second electrode lead 97 extends to part of the outer peripheral area on the third surface 21*b*, and makes contact with the transparent electrically conductive layer 7 on the second surface 11*b* to form an electrical connection. The other end of the second electrode lead 97 is arranged in the same way as the first electrode lead 96. In addition, at least part of the film layer stack 8 deposited on the third surface 21*b* is etched or masked to form the second non-electrically conductive region 81, so as to electrically insulate the first electrically conductive substrate from the second electrically conductive substrate. In the improved technical scheme mentioned above, the electrode leads may be electrically conductive metal wires such as electrically conductive copper wires and silver wires. At the initial stage of manufacturing, one end of the electrode lead is embedded in the sealing member 3 to form an electrical connection with the sealing member 3, and the whole lead is led out to the back of the electrochromic mirror element through an insulated protective wire sleeve outside, so as to facilitate flexible electrical connection with the lead led from the circuit board.

As an alternative embodiment, one end of the first electrode lead 96 extends to part of the outer peripheral area on the third surface 21*b* and is fixed in the sealing member 3, instead of directly making contact with the film layer stack 8 on the third surface 21*b* to form an electrical connection, and the first electrode lead 96 and the film layer stack 8 are electrically connected by arranging electrically conductive silver paste which may be arranged at the position of the electrode lead-out channel. Further, the film layer stack 8 extends from the third surface 21*b* to the second edge surface 21*c* to enlarge an electrical contact area between the first electrode lead 96 and the film layer stack 8. One end of the second electrode lead 97 extends to part of the outer peripheral area on the third surface 21*b*, instead of directly making contact with the transparent electrically conductive layer 7 on the second surface 11*b* to form an electrical connection, and the second electrically conductive lead 97 and the transparent electrically conductive layer 7 are electrically connected by arranging electrically conductive silver paste which is arranged at a position where the electrode lead-out channel communicates with the transparent electrically conductive layer, that is, the communication position of the first edge surface 11*c*, the second edge surface 21*c* and an outer surface of the sealing member 3. Further, the transparent electrically conductive layer 7 extends from the second surface 11*b* to the first edge surface 11*c* to increase an electrical contact area between the second electrode lead 97 and the transparent electrically conductive layer 7.

In at least one embodiment, the electrode uses at least one of copper, silver, nickel or other electrically conductive metal or alloys thereof as an electric contactor.

Through etching or masking at different positions of the second surface 11*b* and the third surface 21*b* to form the non-electrically conductive areas, a short circuit between the first electrically conductive substrate and the second electrically conductive substrate can be effectively prevented. As a further improvement, in at least one embodiment, the non-electrically conductive areas are correspondingly filled with non-electrically conductive materials to further improve the electrical insulation performance between the first electrically conductive substrate and the second electrically conductive substrate. The electrical connection between the first electrically conductive substrate and the second electrically conductive substrate and the circuit board is finally completed through the arrangement of the electrode lead-out of the electrically conductive clip and the electrical insulation mode.

It can be understood that those of ordinary skill in the art can apply the related materials and electrode lead-out method of the electrochromic mirror element to the structures described in detail in the above embodiments in FIGS. 4-13, so that those of ordinary skill in the art can clearly know the specific implementation of the inventive concept.

It can be seen that the present invention has considerable advantages compared with the prior art. The basic principle, main features and advantages of the present invention are shown and described above. Those of ordinary skill in the art should understand that the present invention is limited by the above-mentioned embodiments. What is described in the above-mentioned embodiments and the description is only to illustrate the principles of the present invention. Without departing from the spirit and scope of the present invention, the present invention may have various changes and improvements, which all fall within the scope of the claimed invention.

The invention claimed is:

1. A vehicle rear-view mirror assembly, comprising:
an electrochromic mirror element, the element comprising:
a substantially transparent first electrically conductive substrate comprising a first surface, a second surface and a first edge surface adjacent to the first surface and the second surface;
a substantially transparent second electrically conductive substrate comprising a third surface, a fourth surface and a second edge surface adjacent to the third surface and the fourth surface, the first electrically conductive substrate and the second electrically conductive substrate being arranged at a distance from each other;
a sealing member arranged substantially in a circumferential direction between outer peripheral areas of the first electrically conductive substrate and the second electrically conductive substrate to hermetically bond the second surface to the third surface and to define a cavity;
an electrochromic medium provided in the cavity; and
a substantially transparent concave housing, comprising a housing top with an outer top surface and an inner top surface, and a housing side with an outer side surface and an inner side surface, the inner top surface being attached to the first surface, the inner side surface completely covering the first edge surface and the second edge surface and being attached to the first edge surface and the second edge surface, a shielding layer being arranged along an outer peripheral area of the housing top and along the housing side, and the sealing member being hidden behind the shielding layer when viewed from the outer top surface and the outer side surface.

2. The vehicle rear-view mirror assembly of claim 1, wherein the first electrically conductive substrate consists of a substantially transparent first substrate and a transparent electrically conductive layer deposited on the first substrate.

3. The vehicle rear-view mirror assembly of claim 1, wherein the second electrically conductive substrate consists of a substantially transparent second substrate and a film layer stack deposited on the second substrate.

4. The vehicle rear-view mirror assembly of claim 2, wherein the transparent electrically conductive layer may be selected from at least one of $SnO_2$ doped with fluorine, or ZnO, $SnO_2$, $In_2O_3$, $TiO_2$, $HfO_2$ or CuO doped with metal ions, or may be selected from a metal oxide/metal/metal oxide film layer.

5. The vehicle rear-view mirror assembly of claim 3, wherein the film layer stack comprises a reflective layer and an electrically conductive layer.

6. The vehicle rear-view mirror assembly of claim 5, wherein the reflective layer is at least one of a metal film layer or a metal oxide film layer.

7. The vehicle rear-view mirror assembly of claim 5, wherein the electrically conductive layer may be selected from at least one of $SnO_2$ doped with fluorine, or ZnO, $SnO_2$, $In_2O_3$, $TiO_2$, $HfO_2$ or CuO doped with metal ions, or may be selected from a metal oxide/metal/metal oxide film layer.

8. The vehicle rear-view mirror assembly of claim 1, wherein the shielding layer is a semitransparent physical layer obtained by surface treatment on the outer peripheral area of the housing top and on the housing side.

9. The vehicle rear-view mirror assembly of claim 1, wherein the shielding layer is a film layer deposited on the outer peripheral area of the housing top and on the housing side.

10. The vehicle rear-view mirror assembly of claim 9, wherein the film layer is made of at least one of Ag, Ti, Al, Cr, Ni, Mo, Ru, Rh, Ir, Pd, or Pt.

11. The vehicle rear-view mirror assembly of claim 1, wherein an outer surface of the concave housing is provided with a curved peripheral edge or rounded peripheral corner with a radius greater than 2.5 mm.

12. The vehicle rear-view mirror assembly of claim 1, wherein the concave housing is made of substantially transparent resin.

13. The vehicle rear-view mirror assembly of claim 1, wherein a medium by which the inner top surface is attached to the first surface is a substantially transparent adhesive.

14. The vehicle rear-view mirror assembly of claim 1, wherein a medium by which the inner side surface is attached to the first edge surface and the second edge surface is a high-performance adhesive.

15. The vehicle rear-view mirror assembly of claim 1, wherein an end face of the housing side of the concave housing is flush with a fourth surface of the second electrically conductive substrate.

16. The vehicle rear-view mirror assembly of claim 1, wherein an end surface of the housing side of the concave housing extends outward and at least partially exceeds a fourth surface of the second electrically conductive substrate.

17. The vehicle rear-view mirror assembly of claim 1, wherein an end face of the housing side of the concave housing extends outward and at least partially covers an outer peripheral area of a fourth surface of the second electrically conductive substrate.

18. The vehicle rear-view mirror assembly of claim 1, wherein at least part of an area between the inner side surface of the concave housing and the second edge surface is provided with a lead-out channel for an electrode.

19. The vehicle rear-view mirror assembly of claim 18, wherein the electrode comprises a first electrical connector and a second electrical connector, the first electrical connector is electrically connected to the first electrically conductive substrate, and the second electrical connector is electrically connected to the second electrically conductive substrate.

20. The vehicle rear-view mirror assembly of claim 19, wherein the first electrical connector and the second electrical connector are detachably connected to the second electrically conductive substrate.

* * * * *